United States Patent
Jones

[11] Patent Number: 6,021,192
[45] Date of Patent: Feb. 1, 2000

[54] TONE DETECTOR

[75] Inventor: Eric Alan Jones, Glendale, Ariz.

[73] Assignee: AG Communication Systems Corporation, Phoeniz, Ariz.

[21] Appl. No.: 09/020,520

[22] Filed: Feb. 9, 1998

[51] Int. Cl.$^7$ ............................................. H04M 1/50
[52] U.S. Cl. ................................ 379/283; 379/386
[58] Field of Search .................... 379/283, 351, 379/386, 418, 282

[56] References Cited

U.S. PATENT DOCUMENTS

| | | | |
|---|---|---|---|
| 4,223,185 | 9/1980 | Picou | 379/283 |
| 4,868,872 | 9/1989 | Roberts et al. | 379/283 |
| 4,922,528 | 5/1990 | Hubert et al. | 379/283 |
| 5,353,345 | 10/1994 | Galand | 379/283 |
| 5,572,588 | 11/1996 | Weng et al. | 379/283 |
| 5,592,544 | 1/1997 | Murata et al. | 379/283 |
| 5,619,564 | 4/1997 | Canniff et al. | 379/283 |
| 5,818,929 | 10/1998 | Yaguchi | 379/283 |
| 5,926,541 | 7/1999 | Irie | 379/386 |

*Primary Examiner*—Scott Wolinsky
*Attorney, Agent, or Firm*—David J. Zwick

[57] ABSTRACT

A tone detector for detecting a multi-tone input signal in the presence of speech and noise, comprising first signal processors that generate output signals indicating the energy level of the input signal with the frequency of one of the component tones being amplified and the frequencies of all other of the component tones being attenuated, a last signal processor that generates an output signal indicating the energy level multiplied by negative one of the input signal with the frequencies of all component tones being attenuated, summing junctions that generate output signals indicating the energy levels of the sum of one of the first signal processor output signals and the last signal processor output signal, and tone validation logic receiving the summing junction output signals that generates a tone detect signal when the summing junction output signals indicate that the component tones satisfy a signaling standard.

13 Claims, 1 Drawing Sheet

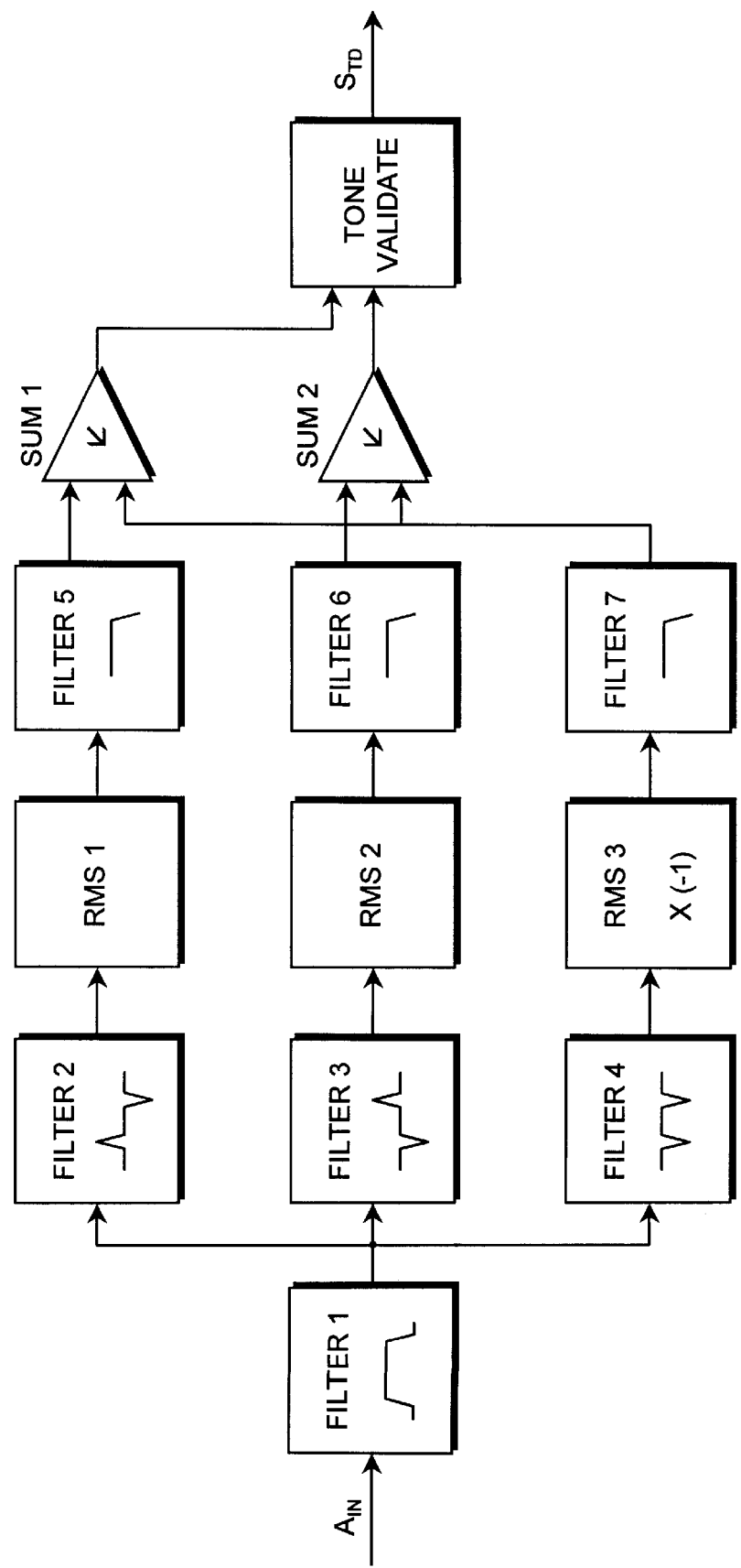

TONE DETECTOR

FIELD OF THE INVENTION

This invention relates generally to signal processing, and more particularly to a tone detector for use in a telecommunications system.

BACKGROUND OF THE INVENTION

In telecommunication systems, the use of in-band tones for signaling is common. For example, touch-tone® phones use a tone that is formed of two component tones to send digits in a signaling scheme called dual-tone multi-frequency (DTMF). Dual tone signaling is also used for the customer premise equipment alerting signal (CAS), subscriber alerting signal (SAS) and visual screen list editing (VSLE) tones. These systems all operate by sending a tone composed of two true tones, each at a predefined frequency. Each signaling system is governed by standards which address parameters such as minimum tone duration, absolute amplitude ranges of the component tones, relative amplitude ranges between component tones, allowable frequency variation of the component tones, and tolerable noise and interference levels.

Prior art detectors typically use band separation techniques where the input signal is split and sent along parallel processing paths. For example, in a dual tone system, one processing path detects the presence of a high tone, the other path detects the presence of a low tone, and final tone validation logic determines if the other parameters are satisfied in the presence of both tones.

The prior art detectors are typically of two designs. In the first design, the processing paths filter an input signal through band select filters, each band select filter being associated with one of the component tones and rejecting the frequencies of all other tones. The band select filter output signals are then passed through limiters, which convert the signals to square waves, then through resonators or narrow bandpass filters that detect the presence of tones at the frequencies in question, and then tone validation logic that determines that the other parameters are satisfied.

In the second design, the processing paths filter an input signal through bandpass filters, each bandpass filter being associated with one of the component tones and passing that tone frequency. The signals are then passed through comparators to determine if signals of sufficient strength are present, then through tone validation logic to determine if the other parameters are satisfied.

These prior art designs are susceptible to false tone detections caused by voice and noise signals in the non-tone frequencies of the input signal.

Accordingly, it is an object of the present invention to provide a tone detection system with improved performance in the presence of speech and noise.

SUMMARY OF THE INVENTION

The present invention is a tone detector for use in a telecommunications system that reliably detects tones in the presence of speech and noise on the line.

The tone detector receives an input signal that is passed in parallel to a number of signal processing paths. The number of paths is equal to the number of component tones in the signaling tone plus one.

In each signal processing path, except for the last path, the signal passes through a combination bandpass and notch filter that amplifies signals at an associated one of the component tone frequencies, attenuates signals at all other tone frequencies and passes signals at non-tone frequencies with unity gain. The combination filters are specified so that the amplification and attenuation gains are the same for all filters. Each filter output signal is then passed to an root mean square (RMS) converter that calculates the overall amplitude of the signal, and then passes to one input of an associated summing junction.

In the last signal processing path, the signal passes through a notch filter that attenuates signals at all component tone frequencies and passes signals at non-tone frequencies with unity gain. This signal is then passed to an RMS converter that calculates the overall amplitude of the signal multiplied by negative one, and then passes to the other input of each of the summing junctions in the first signal processing paths.

The characteristics of each combination filter of the first signal processing paths differ from the characteristics of the notch filter of the last signal processing path only in that the frequency of one of the component tones is allowed through each combination filter. Any difference between the outputs of the RMS converters of the first signal processing paths and the last signaling apath must be due to the presence of component tones in the input signal.

Since each summing junction subtracts the RMS output of the notch filter of the last path from the RMS output of one of the combination filters of first paths, the output of each summing junction is the RMS value of a signal consisting essentially of the associated amplified component tone frequency with all other frequencies removed.

The outputs of the summing junctions are then passed to tone validation logic where parameter values as specified in the signaling standard are tested. If the tone validation logic determines that a valid signaling tone signal is present on the line, a tone detect output signal is asserted.

BRIEF DESCRIPTION OF THE DRAWING

The FIGURE is a block diagram illustrating a preferred embodiment of a tone detector for detecting a dual tone signal in accordance with the present invention.

DETAILED DESCRIPTION OF A PREFERRED EMBODIMENT

The FIGURE shows a block diagram of a preferred embodiment of a tone detector for detecting a dual tone signal in accordance with the present invention. Digital input signal $A_{IN}$ from a telecommunications line is received by FILTER 1, which is a fourth order infinite impulse response (IIR) bandpass filter. The coefficients of this filter are selected based on the sampling frequency of input signal $A_{IN}$ and the low and high frequencies $f_1$ and $f_2$ of the tones to be detected. More specifically, the coefficients are selected such that the peak response $f_p$ of the filter will lie halfway between the frequency components of the signals to be detected, and that the gain at both $f_1$ and $f_2$ will be unity:

$$f_p = \frac{f_1 + f_2}{2}.$$

The purpose of FILTER 1 is to reduce interference by attenuating extraneous signals at frequencies that are lower than frequency $f_1$ and higher than frequency $f_2$.

The output signal of bandpass filter FILTER 1 is passed in parallel to three fourth order IIR filters FILTER 2, FILTER 3 and FILTER 4. The coefficients of these filters are chosen such that frequencies $f_1$ and $f_2$ are either amplified or attenuated, and other frequencies are passed with unity gain. For example, the following coefficients may be used:

| FILTER 2 | 8 dB gain at $f_1$, | Q = 0.02 |
|---|---|---|
|  | −8 dB gain at $f_2$, | Q = 0.02 |
|  | 0 dB gain at all other frequencies |  |
| FILTER 3 | −8 dB gain at $f_1$, | Q = 0.02 |
|  | 8 dB gain at $f_2$, | Q = 0.02 |
|  | 0 dB gain at all other frequencies |  |
| FILTER 4 | −8 dB gain at $f_1$, | Q = 0.02 |
|  | −8 dB gain at $f_2$, | Q = 0.02 |
|  | 0 dB gain at all other frequencies. |  |

The outputs of FILTER 2 and FILTER 3 are passed to RMS converters RMS 1 and RMS 2, respectively. These RMS converters calculate the overall amplitude of the FILTER 2 and FILTER 3 output signals. The output of FILTER 4 is passed to RMS converter RMS 3, which calculates the overall amplitude of the FILTER 4 output signal multiplied by negative one.

The outputs from RMS 1, RMS 2 and RMS 3 are passed to first order low-pass IIR filters FILTER 5, FILTER 6 and FILTER 7, respectively. Filters FILTER 5, FILTER 6 and FILTER 7 act as smoothing filters and have coefficients chosen such that the step response of each filter response matches the settling times of FILTER 2, FILTER 3 and FILTER 4, respectively. These smoothing filter coefficients act to smooth the RMS 1, RMS 2 and RMS 3 output signals, yet provide a very fast step response.

The outputs of FILTER 5 and FILTER 7 are mixed at summing junction SUM 1, and the outputs of FILTER 6 and FILTER 7 are mixed at summing junction SUM 2. The output RMS values of SUM 1 and SUM 2 will be essentially equal to the RMS values of a signal having the $A_{IN}$ input tones at $f_1$ and $f_2$ with all extraneous signals removed.

Using the exemplary FILTER 2, FILTER 3 and FILTER 4 coefficients from above, this can be shown as follows. For an $A_{IN}$ signal component at frequency $f_1$, the gains through FILTER 2 and FILTER 4 will respectively be:

$$g_2 = 10^{\frac{8db}{10}} \cong 6.31 \text{ and } g_4 = 10^{\frac{-8db}{10}} \cong 0.16.$$

The output at SUM 1 for a signal x with frequency $f_1$ and RMS amplitude A will be:

rms($g_2 \cdot x$)−rms($g_4 \cdot x$)=rms[$x \cdot (g_2-g_4)$]=($g_2 g_4$)·rms[$x$]=6.15·A.

For an $A_{IN}$ signal component at frequency $f_2$, the gains through FILTER 2 and FILTER 4 will respectively be:

$$g_2 = 10^{\frac{-8db}{10}} \cong 0.16 \text{ and } g_4 = 10^{\frac{-8db}{10}} \cong 0.16.$$

The output at SUM 1 for a signal y with frequency $f_2$ and RMS amplitude A will be:

rms($g_2 \cdot y$)−rms($g_4 \cdot y$)=rms[$y \cdot (g_2-g_4)$]=($g_2-g_4$)·rms[$y$]=0.

For components of an $A_{IN}$ signal other than those at frequencies $f_1$ and $f_2$, the gains through FILTER 2 and FILTER 4 will respectively be:

$$g_2 = 10^{\frac{0db}{10}} = 1.0 \text{ and } g_4 = 10^{\frac{0db}{10}} = 1.0.$$

The output at SUM 1 for a signal z with a frequency not equal to $f_1$ or $f_2$ will be:

rms($g_2 \cdot z$)−rms($g_4 \cdot z$)=rms[$z \cdot (g_2 \cdot g_4)$]=($g_2 g_4$)·rms[$z$]=0.

The net result is that all signals except for those having a frequency of $f_1$ will be almost completely attenuated at the output of SUM 1.

It can be similarly shown that all signals except for those having a frequency of $f_2$ will be almost completely attenuated at the output of SUM 2.

The outputs of SUM 1 and SUM 2 are passed to tone validation logic TONE VALIDATE where parameter values as specified in the signaling standard are tested. If TONE VALIDATE determines that a valid dual tone signal is present on the line, a tone detect output signal $S_{TD}$ is asserted for processing by downstream components not shown in the FIGURE.

In the general embodiment of the present invention, the tone detector is easily adapted to detect a tone signal of any number of component tones. Bandpass filter FILTER 1 is specified to attenuate extraneous signals at frequencies that are lower than the frequency of the lowest component tone and higher than the frequency of the highest component tone. In the first set of signal processing paths, corresponding to the two paths with FILTER 2 and FILTER 3 in the embodiment above, each combination filter is specified to amplify signals at one of the component tone frequencies, attenuate signals at all other tone frequencies and pass signals at non-tone frequencies with unity gain. The notch filter of the last signal processing path is specified to attenuate signals at all component tone frequencies and pass signals at non-tone frequencies with unity gain. It can be seen that the output of each summing junction will be the RMS value of a signal with a tone at the amplified frequency of the associated combination filter with all other frequencies almost completely attenuated. The output of each summing junction is then passed to tone validation logic where other parameters as specified in the signaling standards are tested.

Although specific embodiments of the dual tone detector have been described, it will be apparent to those skilled in the art that many alternative embodiments are possible without departing from the scope and spirit of the present invention. For example, although a digital system is described, an analog implementation is also possible. Also, although IIR filters and specific coefficients are described, any suitable filter types resulting in an embodiment that satisfies the purposes of the present invention may also be used. Also, certain filters act only to improve signal quality and under certain conditions may be eliminated. The system may also be implemented as discrete components, or implemented in a digital signal processor (DSP) or other suitable processor.

While a preferred embodiment of the dual tone detector has been particularly shown and described, it is not intended to be exhaustive nor to limit the invention to the embodiment disclosed. It will be apparent to those skilled in the art that modifications such as those described above can be made to the present invention without departing from the scope and spirit thereof. It is intended that the scope of the invention be defined by the claims appended hereto and their equivalents.

What is claimed is:

1. A tone detector for processing an input signal in the presence of speech and noise, said input signal having an intermittent signal tone with a plurality of component tones at predetermined frequencies, said signal tone operated in accordance with a signaling standard, comprising:

a plurality of first signal processors, each operated to generate an output signal indicating an energy level of said input signal with one of said predetermined frequencies being amplified and all other of said predetermined frequencies being attenuated;

a last signal processor operated to generate an output signal indicating an energy level multiplied by negative one of said input signal with all of said predetermined frequencies being attenuated;

a plurality of summing junctions, each operated to generate an output signal indicating an energy level of the sum of one of said first signal processor output signals and said last signal processor output signal; and tone validation means operated in response to said plurality of summing junction output signals to generate a tone detect signal when said summing junction output signals indicate that said component tones satisfy said signaling standard.

2. A tone detector according to claim 1, wherein each of said first signal processors comprise:

filter means connected to said input signal and operated to amplify said one of said predetermined frequencies and attenuate said all other of said predetermined frequencies; and root mean square converter means connected to said filter means and operated to generate said first signal processor output signal.

3. A tone detector according to claim 2, wherein said filter means further operates to pass with unity gain all non-component-tone frequencies.

4. A tone detector according to claim 3, wherein said filter means comprises a fourth order infinite impulse response filter.

5. A tone detector according to claim 2, wherein each of said first signal processors further comprise a smoothing filter means connected to said root mean square converter and operated to generate said first signal processor output signal.

6. A tone detector according to claim 5, wherein said smoothing filter means comprises a first order low-pass infinite impulse response filter.

7. A tone detector according to claim 1, wherein said last signal processor comprises:

filter means connected to said input signal and operated to attenuate all of said predetermined frequencies; and root mean square converter means connected to said filter means and operated to generate said last signal processor output signal.

8. A tone detector according to claim 7, wherein said filter means further operates to pass with unity gain all non-component-tone frequencies.

9. A tone detector according to claim 8, wherein said filter means comprises a fourth order infinite impulse response filter.

10. A tone detector according to claim 7, wherein said last signal processor further comprise a smoothing filter means connected to said root mean square converter and operated to generate said last signal processer output signal.

11. A tone detector according to claim 10, wherein said smoothing filter means comprises a first order low-pass infinite impulse response filter.

12. A tone detector according to claim 1, further comprising a bandpass filter means connected between a source of said input signal and said plurality of first signal processors and operating on said input signal to pass with approximately unity gain frequencies between the frequency of the lowest and highest of said component tones, and to attenuate all other frequencies.

13. A tone detector according to claim 12, wherein said bandpass filter means comprises a fourth order infinite impulse response bandpass filter.

* * * * *